United States Patent
SenGupta et al.

(10) Patent No.: US 7,943,690 B2
(45) Date of Patent: May 17, 2011

(54) WATER-DISPERSIBLE ORGANOCLAYS

(75) Inventors: Ashoke K. SenGupta, Barrington, IL (US); David McGregor, Grayslake, IL (US); Jerald W. Darlington, Jr., Marengo, IL (US)

(73) Assignee: Amcol International Corporation, Hoffman Estates, IL (US)

( * ) Notice: Subject to any disclaimer, the term of this patent is extended or adjusted under 35 U.S.C. 154(b) by 418 days.

(21) Appl. No.: 12/252,949

(22) Filed: Oct. 16, 2008

(65) Prior Publication Data

US 2009/0099294 A1    Apr. 16, 2009

Related U.S. Application Data

(60) Provisional application No. 60/980,206, filed on Oct. 16, 2007.

(51) Int. Cl.
*C08K 9/04* (2006.01)
*C08K 5/19* (2006.01)
*C08K 3/34* (2006.01)
*C09C 1/42* (2006.01)

(52) U.S. Cl. .......................... 524/445; 524/446; 524/447

(58) Field of Classification Search .................. 524/445, 524/446, 447; 510/507
See application file for complete search history.

(56) References Cited

U.S. PATENT DOCUMENTS

| | | | |
|---|---|---|---|
| 5,604,197 A * | 2/1997 | Busch et al. | 510/516 |
| 5,721,306 A * | 2/1998 | Tsipursky et al. | 524/449 |
| 5,998,528 A * | 12/1999 | Tsipursky et al. | 524/445 |
| 6,172,121 B1 * | 1/2001 | Chaiko | 516/101 |
| 6,225,394 B1 | 5/2001 | Lan et al. | |
| 6,242,500 B1 | 6/2001 | Lan et al. | |
| 6,399,690 B2 | 6/2002 | Lan et al. | |
| 6,407,155 B1 | 6/2002 | Qian et al. | |
| 2003/0232912 A1 * | 12/2003 | Rosenthal et al. | 524/445 |
| 2004/0122152 A1 * | 6/2004 | SenGupta et al. | 524/425 |
| 2004/0229991 A1 * | 11/2004 | SenGupta et al. | 524/445 |
| 2005/0112074 A1 * | 5/2005 | Arai et al. | 424/70.1 |

FOREIGN PATENT DOCUMENTS

| | | | |
|---|---|---|---|
| JP | 05246824 A * | 9/1993 | |
| JP | 2006056932 A * | 3/2006 | |
| WO | WO 2004010960 A1 * | 2/2004 | |

OTHER PUBLICATIONS

Machine Translation of JP 05-246824 A.*
Machine Translation of JP 2006-056932 A.*

* cited by examiner

*Primary Examiner* — Milton I Cano
*Assistant Examiner* — Darcy D LaClair
(74) *Attorney, Agent, or Firm* — Marshall, Gerstein & Borun LLP

(57) ABSTRACT

The surface of hydrophobically-modified smectite clays (i.e., organophilic clays) are modified using a hydrophilic polymer, wherein the hydrophilic surface-modification of a hydrophobically-modified smectite clay with a hydrophilic polymer, renders the organoclays adequately dispersible in water.

12 Claims, No Drawings

WATER-DISPERSIBLE ORGANOCLAYS

BACKGROUND OF THE INVENTION

Smectite clays, also known as water-swellable layered silicates, are dispersible in water but not in hydrophobic liquids. In contrast, hydrophobically-modified smectite clays, often referred to as organoclays, are dispersible in hydrophobic liquids but not in water. Overcoming the limitation of poor aqueous-dispersibility of organoclays would enable these hydrophobically surface-modified clays to reach new frontiers of clay-based technologies. The present invention fills this void, revealing compositions and methods for rendering organoclays water-dispersible.

Smectite clay particles are plate-like particles (hence referred to herein as platelets), having face (basal) and edge surfaces. Organophilic smectite clays are the hydrophobically surface-modified smectite clays, a portion of whose surface is switched from being hydrophilic to hydrophobic, by adsorbing hydrophobic surface-modifying agents onto the platelet surface. The surface-modifier can be a surfactant, for example, an alkyl quaternary ammonium compound, preferably with $C_8$-$C_{22}$ alkyl chain(s), or a hydrophobic polymer.

Being dispersible only in hydrophobic liquids or oil phases, organoclays are always included in the "oil"- or hydrophobic-phases of compositions used in various industrial applications and consumer products. These compositions can be anhydrous compositions, or oil-in-water emulsions, or water-in-oil emulsions. Ordinarily, when mixed with water (even under high-shear mixing), the organoclays would invariably show a high level of particle agglomeration, with the agglomerated particles visibly appearing in the form of lumps or clusters.

Using organophilic clays in water-based applications hitherto has not been possible, since the prior art does not contain teachings as to how to optimally disperse these clays in water, wherein the clay platelets could then effectively provide for a targeted benefit. For example, it might be possible to use organoclays as surface-conditioning agents, as in hair-conditioning and fabric-softening, if they could be dispersed in water-based compositions such as shampoos, conditioners, detergents, and fabric-softeners.

The aforementioned void in the prior art hitherto has prevented the use of organoclays in applications requiring water-based dispersions of organoclays. Therefore, compositions, wherein organoclays can be adequately dispersed in aqueous solutions, would greatly facilitate developing novel applications for organoclays. An object of the present invention is to provide these compositions.

SUMMARY OF THE INVENTION

Unexpectedly, it was found during the research that led to the present invention, that the surface of hydrophobically-modified smectite clays (i.e., organophilic clays) could be modified further using hydrophilic polymers, wherein the hydrophilic surface-modification of the hydrophobically-modified smectite clay with a hydrophilic polymer, would render the organoclays adequately dispersible in water. Without limiting to any particular theory, it is speculated herein that the hydrophobic modification, for example, due to the adsorption of an alkyl quaternary ammonium compound, occurs over a portion of the clay-surface, while the whole or a portion of the remaining clay-surface provides the adsorption-sites for subsequent adsorption of any hydrophilic polymer. By "adequate dispersion" is meant that, shearing the organoclay in water or aqueous solutions, does not result in visibly apparent agglomeration or clumping of clay-platelets; rather, the dispersion shows a smooth texture with no apparent signs of heavy agglomeration of particles (as determined by particle size analysis or optical microscopy or rheological/viscosity measurements with 30% or higher amounts of dispersed particles, wherein the lower the viscosity, the less agglomerated the particles). Signs of heavy agglomeration can be visually seen more easily after diluting the dispersion with water to an organoclay amount of about 0.75-1.5% by weight of the diluted dispersion.

According to an embodiment of the present invention, the organophilic clay is produced by the adsorption of an onium ioin, preferably resulting from the water solubilization of a $C_8$-$C_{22}$ alkyl quaternary ammonium compound, on the basal surfaces of smectite clay platelets. The underlying mechanism for adsorption is cation-exchange between some of the onium cations counterbalancing the anionic charge on the basal surfaces, and the cation in the alkyl quaternary ammonium compound. The amount of the alkyl quaternary ammonium compound adsorbed on the clay surface preferably corresponds to at least 10% of the total cationic exchange capacity of the smectite clay.

Alternatively, the organoclay may be produced by the adsorption of a hydrophobic polymer that is generally soluble or dispersible in hydrophobic liquids. Most preferably, this surface-modifying polymer is an amphiphilic copolymer, a block or a graft copolymer, wherein one of the comonomers is hydrophobic and is soluble or dispersible in a hydrophobic liquid, while the other comonomer is hydrophilic and is insoluble in a hydrophobic liquid, with the molar ratios of the two comonomers being such that the copolymer as a whole is soluble or dispersible in a hydrophobic liquid. The amount of the hydrophobic, surface-modifying polymer is preferably at least 5% of the dry-weight of the clay.

It has now been found that an organophilic clay produced using any of the foregoing hydrophobic surface-modifications, wherein the organoclay is dispersible only in hydrophobic liquids, can revert to being water-dispersible, if the organophilic clay is further surface-treated by co-adsorbing at least one water-soluble or water-dispersible, hydrophilic polymer on the clay-surface. The hydrophilic, surface-modifying polymer is of the types noted below.

i) Cationic polymer
   ii) Anionic polymer
   iii) Nonionic polymer
   iv) Amphoteric polymer
   v) Water-soluble or water-dispersible, amphiphilic copolymer
   vi) Hydrophobically-modified water-soluble or water-dispersible polymers

DETAILED DESCRIPTION OF THE INVENTION

The compositions described herein comprise the following essential components:
   i) A smectite clay having a cationic exchange capacity in the range of 50-150 milliequivalent/gm of the clay, on a moisture-free basis;
   ii) An onium-ion liberating compound, preferably an alkyl quaternary ammonium compound, having an alkyl chain length of $C_8$-$C_{22}$, adsorbed on the basal surfaces of the foregoing smectite clays;
   iii) Alternatively, or in combination with the above alkyl quaternary ammonium compound, an amphiphilic copolymer, for example, PEG 30 Dipolyhydroxystearate, adsorbed on the basal and edge surfaces of the foregoing smectite clays;

iv) A hydrophilic polymer adsorbed on any or both of the basal and edge surfaces of the foregoing smectite clays; and v) Water The smectite clay, in its pre-modified form, is first surface-treated with (i) an onium ion, preferably liberated from an alkyl quaternary ammonium compound; and/or (ii) an amphiphilic copolymer, producing thereby an organophilic clay, which in turn is further surface-treated with a hydrophilic polymer. The resulting water-dispersible organoclays remain wholly dispersed in the water phase of the claimed compositions. The object of the present invention cannot be met by compositions wherein the organoclay is added to or remain dispersed in the "oil" or the hydrophobic phase of the compositions, even if the water-phase of such compositions contains a hydrophilic polymer.

The amount of the smectite clay (based on its pre-modified form and moisture-free basis) can be in the range of 0.1-60% by weight of the claimed compositions. The amount of the onium ion-liberating compound, e.g., the alkyl quaternary ammonium compound is preferably in the range of 10%-75%, more preferably in the range of 30-65%, and most preferably in the range of 45-60% by weight of the smectite clay (moisture-free basis). The amount of the hydrophobic copolymer is in the range of 5-100% by weight of the smectite clay (moisture-free basis). The amount of the hydrophilic polymer is preferably in the range of 0.5-50%, more preferably in the range of 10-40%, and most preferably in the range of 1-20% by weight of the smectite clay (moisture-free basis). The amount of water is in the range of 1-99% by weight of the claimed compositions.

Non-limiting examples of the alkyl quaternary ammonium compound include di(hydrogenated tallowalkyl)dimethyl ammonium chloride, dicocoalkyldimethyl ammonium chloride, and n-dialkyl methyl benzyl ammonium chloride. The alkyl quaternary ammonium compound may be hydroxylated and/or ethoxylated. Others are disclosed in this assignees U.S. Pat. Nos. 6,225,394; 6,242,500; 6,399,690; and 6,407,155, all hereby incorporated by reference.

According to a preferred embodiment of the present invention, the hydrophilic surface-modifying polymer preferably has a weight average molecular weight of less than 5 million Dalton, more preferably less than 1,000,000 Dalton, and most preferably less than 100,000 Dalton. Examples of the preferred cationic polymers include poly(diallyldimethylammonium halide), polyquaternary amine polymers prepared from epichlorohydrin and dimethylamine, polyamines, and copolymers of each of these polymers. The preferred anionic polymers include polycarboxylate (e.g., non-cross-linked polyacrylate, humate), polyphosphate (e.g., sodium tripolyphosphate), polyphenolate(lignosulfonate, humate), ethoxylated and/or hydroxylated polysulfate, ethoxylated and/or hydroxylated polysulfonate (e.g., polynapthalene sulfonate, lignosulfonate), and their copolymers. The preferred nonionic polymers include polyethylene glycol, polyethylene oxide, polyvinyl alcohol, polyvinyl pyrrollidone, polyacrylamide, cellulose and its derivatives, starch and its derivatives, and various gum-based natural polymers. The preferred cationic and anionic polymers have a charge density of at least 1.5 milliequivalents per gram of the polymer.

To achieve the full advantage of the present invention, it is preferred that the smectite clay-surface first undergoes hydrophobic surface-modification upon treatment with a hydrophobic surface-modifier of the type noted above, followed by further surface-modification using a water-soluble or water-dispersible, hydrophilic polymer. Accordingly, the surface-modification is typically carried out by shearing the smectite clay with a hydrophobic surface-modifier, followed by shearing the resulting organophilic clay with at least one hydrophilic polymer. The shearing of the clay with the surface-modifiers can be carried out in both "dry" and "wet" mixes, with a water content varying from about 1% to about 99% by weight of the composition. Alternatively, the smectite clay is sheared with a mixture of hydrophobic and hydrophilic surface modifiers.

Depending on the type of final product compositions they are used as, the claimed compositions may further contain ingredients selected from anionic, cationic, nonionic, and zwitterionic surfactants, hydrophilic liquids such as glycols, ethanol, and glycerin, fatty alcohols having 8 to 22 carbon atoms, opacifiers or pearlescers such as ethylene glycol esters of fatty acids (e.g., ethylene glycol distearate), viscosity and rheology modifiers selected from polymers, coplymers, cross-polymers, smectite clays, silica, silicate minerals, and inorganic oxides, buffering or pH adjusting chemicals, foam-boosters, perfumes and fragrances, dyes, coloring agents or pigments, herb extracts, emollients, silicone fluids, esters, triglycerides, fatty acids, waxes, clays, water-insoluble inorganic oxides and salts, preservatives, hydrotopes, enzymes, bleaches, fabric conditioners, optical brighteners, antioxidants, stabilizers, UV absorbers, thickeners, dispersants, soil release agents, anti-wrinkle agents, skin-care actives, polymers, polymeric water- and oil-insoluble particles or microparticles, encapsulants, chelants, anti corrosion agents, and teeth cleansing and whitening agents, and mixtures thereof.

Given below are typical examples of compositions of the present invention.

Example I

This example demonstrates the compositions for water-dispersible organophilic smectite clays derived, upon shearing an organophilic smectite clay (Organo 34, from AMCOL International Corporation) with hydrophilic polymers, taken individually, such as: i) an anionic polymer; ii) a cationic polymer; and iii) a nonionic polymer. The organophilic clay is produced by adsorbing an alkyl quaternary ammonium compound, namely, di(hydrogenated tallowalkyl)dimethyl ammonium chloride onto the basal surface of the smectite clay. The amount of the alkyl quaternary ammonium compound is about 55-60% by weight of the unmodified smectite clay (dry-basis).

TABLE I

| Batch No. | Hydrophilic Polymer | Weight % of Organophilic Clay (dry-basis) | Weight % of Hydrophilic Polymer (active-basis) | Weight % of Water and any pH-adjustment Reagent |
|---|---|---|---|---|
| 1 | None | 15 | 0 | 85 |
| 2 | Anionic Polymer - Sodium Polyacrylate, pH adjusted to 7, (Sokalan PA 40 from BASF Corporation | 15 | 2.25 | 82.75 |
| 3 | Anionic Polymer - Sodium Humate, pH adjiusted to 7, from AMCOL International Corporation) | 15 | 2.25 | 82.75 |

TABLE I-continued

| Batch No. | Hydrophilic Polymer | Weight % of Organophilic Clay (dry-basis) | Weight % of Hydrophilic Polymer (active-basis) | Weight % of Water and any pH-adjustment Reagent |
|---|---|---|---|---|
| 4 | Cationic Polymer - Poly(Diallyl dimethyl ammonium chloride (Zetag 7122 from Ciba Specialty Chemical | 15 | 2.25 | 82.75 |
| 6 | Non-ionic Polymer - Polyvinyl Alcohol (CELVOL 508 from Celanese Corporation) | 15 | 2.25 | 82.75 |

Manufacturing Procedure

Weigh out the hydrophilic polymer, water, and any pH-adjustment reagent in a suitable vessel Transfer the batch to a rotor-stator homogenizer (Silverson Homogenizer), and mix well until uniform While continuing to mix the batch, add the organoclay in small portions Continue homogenizing the batch until uniform Example II This example demonstrates the water-dispersibility (without heavy agglomeration of particles) of the organophilic clay (Organo 34) upon shearing the organophilic clay with the hydrophilic polymers in Table I, inasmuch as Table II shows that the particle size was reduced when the organophilic clay was treated individually with each of the hydrophilic polymers from Table I. The particle size measurements were carried out using Coulter LS 230 particle size analyzer with volume % analysis. Each of the dispersion samples in Table II was diluted by a factor of 20X with deionized water, and these diluted samples were used for particle size analysis. Even though the mean particle size for Batch #1 was measured as being 14.24 micron, the particles visually appeared to be heavily agglomerated, with the size of the agglomerated particles appearing to be much greater than the measured value. The batches corresponding to the hydrophilic polymer-treatments did not show such heavy agglomeration of particles. It is speculated herein that the agglomerated particles in Batch #1 got broken down to smaller aggregates (due to flow-induced shear forces) during particle size analysis, since the Coulter LS 230 uses dilution of a test sample in water circulating (and hence the possibility of flow-induced shear forces) through the instrument as part of the measurement procedure.

TABLE II

| Batch No. from Table I | Hydrophilic Polymer | Mean Particle Size, Micron |
|---|---|---|
| 1 | None | 14.24 |
| 2 | Sodium Polyacrylate | 8.17 |
| 3 | Sodium Humate | 1.25 |
| 4 | Poly(Diallyldimethyl ammonium chloride) | 6.21 |
| 5 | Polyvinyl alcohol | 6.23 |

What is claimed herein is:

1. A composition comprising water and a surface-modified smectite clay, wherein the clay is sheared with a hydrophobic surface-modifier comprising an alkyl quaternary ammonium compound and an amphiphilic copolymer selected from the group consisting of PEG 30 Dipolyhydroxystearate, polyglyceryl-2-dipolyhydroxystearate, and mixtures thereof, to produce an organophilic, hydrophobically surface-modified clay which is not dispersible in water without visibly apparent particle agglomeration or clumping, and wherein the surface of the hydrophobically surface-modified clay is subsequently hydrophilically-modified by shearing the organophilic clay with a hydrophilic polymer having a weight average molecular weight of less than 1,000,000 Dalton, such that the hydrophilic surface-modification achieved by the hydrophilic polymer renders the organophilic clay dispersible in water.

2. The composition of claim 1, wherein the alkyl quaternary ammonium compound has an alkyl chain length of $C_8$-$C_{22}$.

3. The composition of claim 1, wherein the hydrophilic polymer is selected from the group consisting anionic, cationic, nonionic, zwitterionic polymer or copolymer, and mixtures thereof.

4. The composition of claim 1, wherein the amount of water is in the range of 1-99% by weight of the composition.

5. The composition of claim 1, wherein the amount of the smectite clay in its pre-modified form (dry-basis) is in the range of 0.1-60% by weight of the composition.

6. The composition of claim 1, wherein the amount of the hydrophobic surface-modifier is 10-75% by weight of the dry smectite clay.

7. The composition of claim 1, wherein the amount of the hydrophilic polymer is 0.5-50% by weight of the dry smectite clay.

8. A method of making a smectite clay dispersible in water comprising shearing the clay with a hydrophobic surface-modifier comprising an alkyl quaternary ammonium compound and an amphiphilic copolymer selected from the group consisting of PEG 30 Dipolyhydroxystearate, polyglyceryl-2-dipolyhydroxystearate, and mixtures thereof, to produce an organophilic, hydrophobically surface-modified clay which is not dispersible in water without particle agglomeration or clumping, and hydrophilically-modifying the surface of the hydrophobically-modified clay by shearing the organophilic clay, in water, with a hydrophilic polymer having a weight average molecular weight of less than 1,000,000 Dalton, such that the hydrophilic surface-modification achieved by the hydrophilic polymer renders the organophilic clay dispersible in water.

9. The method of claim 8, wherein the alkyl quaternary ammonium compound has an alkyl chain length of $C_8$-$C_{22}$.

10. The method of claim 8, wherein the hydrophilic polymer is selected from the group consisting anionic, cationic, nonionic, zwitterionic polymer or copolymer, and mixtures thereof.

11. The method of claim 8, wherein the amount of the hydrophobic surface-modifier is 10-75% by weight of the dry smectite clay.

12. The method of claim 8, wherein the amount of the hydrophilic polymer is 0.5-50% by weight of the dry smectite clay.

* * * * *